US010432503B1

(12) United States Patent
Rzehak et al.

(10) Patent No.: US 10,432,503 B1
(45) Date of Patent: Oct. 1, 2019

(54) DISTRIBUTION OF PREFIXES IN A NETWORK

(71) Applicant: Amazon Technologies, Inc., Seattle, WA (US)

(72) Inventors: Maciej Rzehak, Dublin (IE); Pavel Kiselev, Dublin (IE); Stephen Callaghan, Kildare (IE)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 15/720,890

(22) Filed: Sep. 29, 2017

(51) Int. Cl.
*H04L 12/723* (2013.01)
*H04L 12/741* (2013.01)
*H04L 12/733* (2013.01)
*H04L 12/707* (2013.01)

(52) U.S. Cl.
CPC .......... *H04L 45/122* (2013.01); *H04L 45/54* (2013.01); *H04L 45/22* (2013.01); *H04L 45/745* (2013.01)

(58) Field of Classification Search
CPC ..... H04L 12/733; H04L 12/741; H04L 45/22; H04L 45/54; H04L 45/122; H04L 45/745; H04L 12/00; H04L 12/28; H04L 12/771–781; H04L 12/947; H04L 45/00; H04L 45/44; H04L 29/0653; G06F 16/00
See application file for complete search history.

(56) References Cited

U.S. PATENT DOCUMENTS

| | | | | |
|---|---|---|---|---|
| 6,392,997 | B1 * | 5/2002 | Chen | H04L 45/02 370/252 |
| 8,830,988 | B2 * | 9/2014 | Hasan | H04L 41/5009 370/351 |
| 9,531,642 | B1 * | 12/2016 | Giacalone | H04L 45/123 |
| 9,942,145 | B2 * | 4/2018 | Yang | H04L 45/745 |
| 10,187,289 | B1 * | 1/2019 | Chen | H04L 45/02 |
| 2013/0121340 | A1 * | 5/2013 | Papadimitriou | H04L 45/02 370/410 |
| 2013/0155845 | A1 * | 6/2013 | Patel | H04L 45/04 370/225 |
| 2015/0312055 | A1 * | 10/2015 | Varga | H04L 12/4641 370/254 |
| 2016/0105358 | A1 * | 4/2016 | Kannan | H04L 45/56 709/238 |
| 2016/0352619 | A1 * | 12/2016 | Gattani | H04L 45/24 |
| 2018/0109450 | A1 * | 4/2018 | Filsfils | H04L 45/50 |

* cited by examiner

*Primary Examiner* — Tri H Phan
(74) *Attorney, Agent, or Firm* — Klarquist Sparkman, LLP

(57) ABSTRACT

Client device prefixes are distributed to other network devices (e.g., routers) in the network inside a special container attribute of an update message. The container attribute is attached as an optional-transitive attribute to a location prefix announcement. A location prefix identifies the Autonomous System (AS) that originates the client prefixes. All of the ID prefixes packed in the container use the location prefix as the recursive next-hop towards them. As a result, all convergence in the network occurs for a small number of location prefixes, while at the same time, the location/ID mapping is being distributed using the Location best-paths. In some embodiments, the container attribute can utilize BGP update packets, or optimized NLRI/attribute packaging. Compression of the ID prefixes can also be used within the messages.

18 Claims, 8 Drawing Sheets

DISTRIBUTION OF PREFIXES IN A NETWORK

BACKGROUND

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Previous strategies for converging on a shared network topology include transmitting route advertisements between routers in a fully meshed network, or using a route reflector to reflect route advertisements sent from one router to all other routers connected to the route reflector. In some protocols (such as BGP) each router maintains a routing information base (RIB) where the router stores all received route information in an on-board memory. The router may then use the information in the RIB to generate a routing table that contains a set of selected next hops for various network address prefixes. There is a desire to expedite convergence for any network changes. Large numbers of prefixes can cause convergence delays resulting in slowing of the overall network throughput or even packet loss.

DETAILED DESCRIPTION

Figure 1:
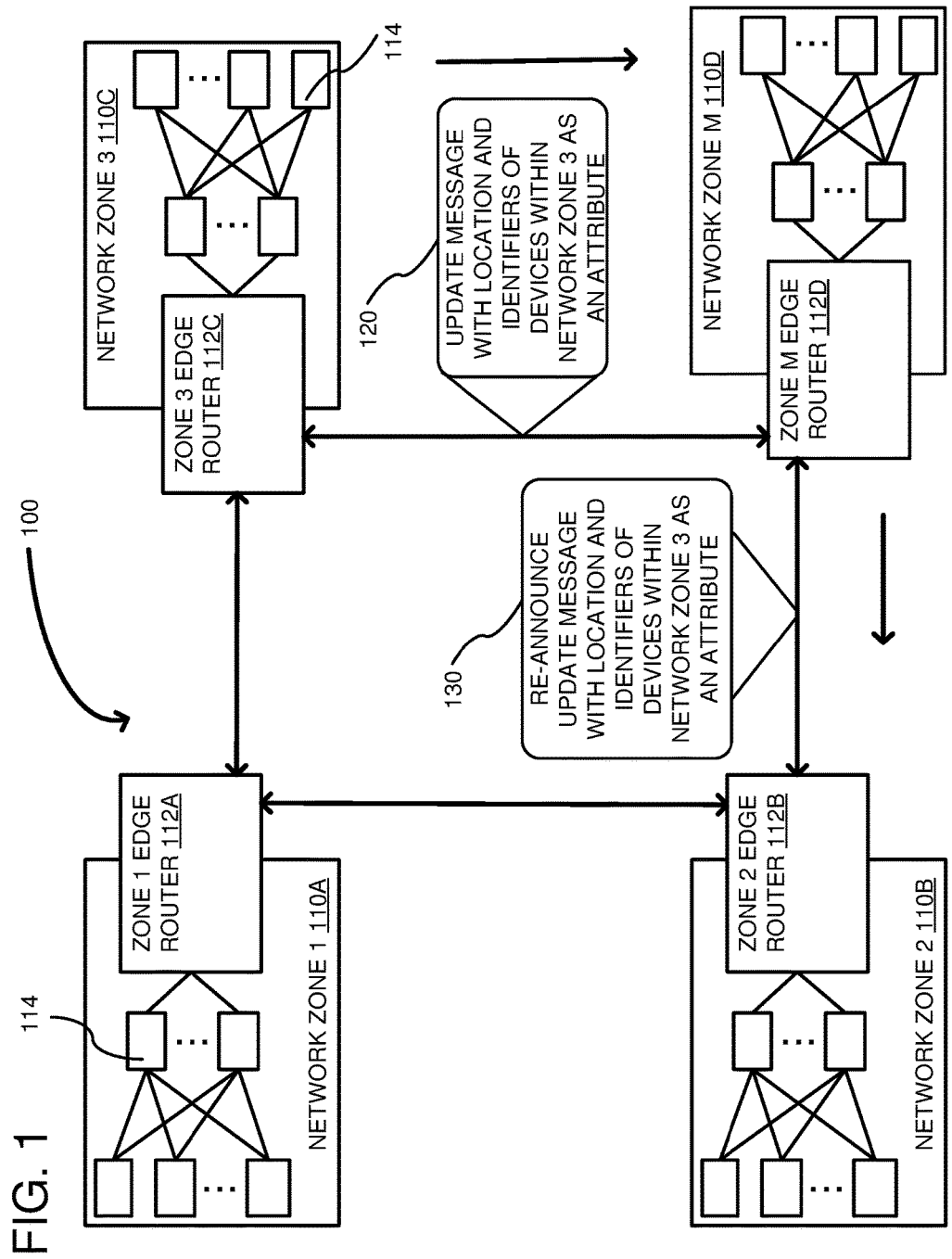
FIG. 1 is a system diagram of a network including a plurality of network zones, wherein update messages are transmitted between the network zones in accordance with one embodiment.

In one embodiment, large scale, multi-Autonomous System (AS) networks are disclosed that retain fast convergence times with low convergence churn, despite a large number of prefixes in the network. An AS location/ID mapping allows building of large scale networks with fast convergence characteristics, without the need of a centralized entities like route reflectors or route servers. In some embodiments, standard, in-band BGP messaging can be used through an introduction of a new attribute type that allows a plurality of prefixes associated with an AS to be stored in a single message. Additionally, attributes associated with the prefixes can be stored within the message and diverse attribute types can be used.

An AS is a group of client devices (e.g., servers) typically controlled by a single Internet Service Provider (ISP) having a uniform policy controlling the client devices. Each client device can be associated with a different network prefix. Thus, an AS is an individual network on the Internet and can be accessed through one or more edge routers. Each AS has a unique Autonomous System Number (ASN).

End client prefixes (also called herein "ID prefixes", "network device prefixes" or "client device prefixes")(which can be IP prefixes) are connected through a specific AS and are distributed to other routers in the network inside a special container attribute. This container attribute is attached as an optional-transitive attribute to a location prefix announcement. A location prefix identifies the AS that originates the client prefixes. All of the ID prefixes packed in the container use the location prefix as the recursive next-hop towards them. As a result, convergence in the network occurs for a small number of location prefixes, while at the same time the location/ID mapping is being distributed using the location best-paths. In some embodiments, the container attribute can utilize BGP update packets, or optimized NLRI/attribute packaging. Compression of the ID prefixes can also be used within the messages.

In one particular embodiment where BGP is used, instead of having a large number of the ID prefixes in the Network Layer Reachability Information (NLRI) section of an update packet, the ID prefixes are grouped as a prefix attribute. This attribute is an extended-length, optional-transitive attribute included in the Path Attributes section of the BGP update message used to announce the location prefix (e.g., the AS), which is included in the NLRI section of the BGP message. When the BGP speaker receives the update message with this ID container attribute, it extracts the ID prefixes together with their attributes from the container, and puts them in the Routing Information Base (RIB). After that, the ID prefixes are subject to normal BGP best path selection process. In prior methods, when a path (prefix+attributes) is selected as best, it is packed into an update message and sent out to other BGP peers. However, in the disclosed embodiments, prefixes, which are treated as IDs and distributed in the ID container attribute, are not re-announced explicitly in the NLRI section to other peers, if they were not originated by the BGP speaker. However, the location prefix, as a standard prefix being distributed in the NLRI section of the update messages, is propagated normally according to standard BGP rules. Additionally, as an attribute of the location prefix, the container is distributed so that the location and ID mapping are distributed at the same time.

FIG. 1 shows an example network 100 including a plurality of network zones 110A-110D coupled together. Although not shown, there are typically intermediate network devices between the network zones 110. In any of the examples described herein, a network zone can be a group of networked computing devices (such as routers) that can be identified as an origin for one or more network address prefixes. As an origin for a network address prefix, a network zone can be regarded by routers in the network as an ultimate destination for data packets destined for network addresses that begin with the network address prefix. Example network address prefixes include IP address prefixes, routing masks, subnet masks, etc. Example network zones include separate availability zones, data centers, subnets, border gateway protocol (BGP) autonomous systems, etc. In practice, any group of networked computing devices that can be identified as a destination for a given network address prefix can be a network zone. One or more computing devices in a network zone can generate routing protocol messages that are transmitted through a computer network and/or between computer networks. The generated routing protocol messages can identify routes through the computer network that can be used by routers in the network to transmit data packets towards computing devices in the network zone. Typically, the computing devices within the network zone all have a same policy applied by an administrator of the network zone. An example computing device is shown at 114 and can be coupled to a network within the network zone 110, such as a CLOS network.

Each network zone 110A-D includes a zone edge router 112A-112D. In any of the examples described herein, a network zone edge router (or edge router) 112 can be a router configured to provide a point of entry for a given network zone. A network zone edge router can be configured to route data packets received from computing devices external to the network zone to computing devices within the network zone. The network zone edge router can also be configured to route data packets received from computing devices internal to the network zone to computing devices external to the network zone. A router that is external to the network zone can be referred to as a non-zone router. An edge router can be configured to transmit route advertisement messages (such as BGP UPDATE messages, or the like) to external routers that identify network address prefixes for which the edge router can act as a next hop in the routing of data transmissions.

In any of the examples described herein, a network computing device or, more simply, network device is any device that includes input/output ports and is configured to route packets there through. Example network devices include routers, switches, bridges, etc. A router can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

FIG. 1 shows an update message 120 used to send routing updates to peer routers. The update message is particularly being transmitted from network zone 110C to 110D. The update message 120 can be in any desired protocol, such as BGP, OSPF, IS-IS, future developed protocols, etc. The update message 120 is shown as including one or more location prefixes (associated with the Network Zone 110C) and ID prefixes associated with network devices 114 within the network zone, wherein the ID prefixes are assigned as an attribute of the location prefix, as further described below. Once the network zone 110D receives the update message, it can re-announce the update message as shown at 130. However, instead of transmitting messages for each individual network device 114, the client prefixes are again included as an attribute of the location prefix.

In some embodiments, the client prefixes can be included in an ID container, wherein each network device prefix (also called a network device address prefix) is concatenated to form a string of network device prefixes and their associated attributes. Additionally, the attributes can be of different types. Example types include origin, AS path, next hop, aggregator, etc. When an ID container is included within an update message, it can include a special type so that a receiving device knows that the string of network device prefixes and their associated attributes are to be unpacked from the container. Additionally, the container can have the network device prefixes compressed so as to compact more prefixes into a single message.

Figure 2:
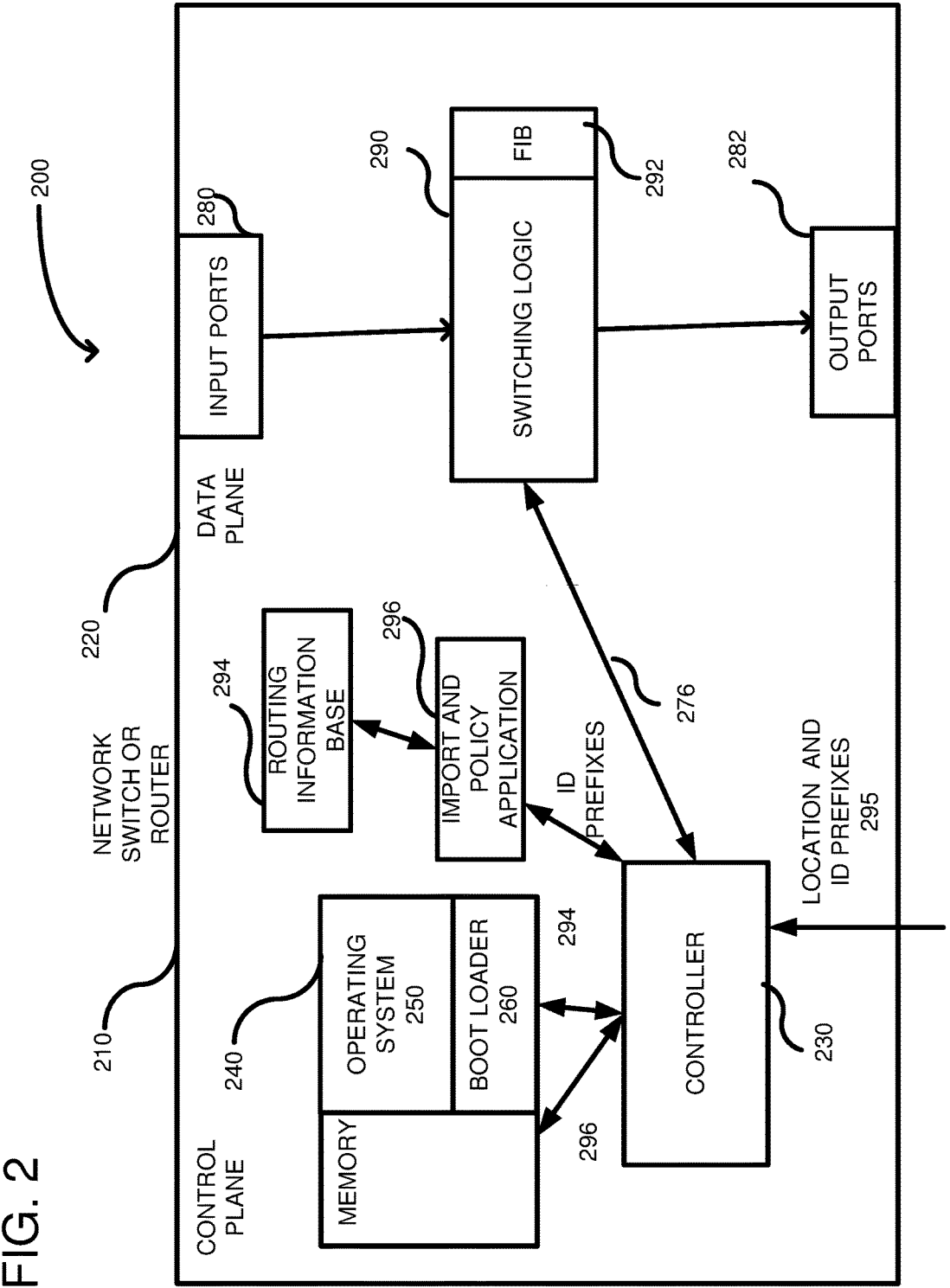
FIG. 2 is an example network device including a control plane and data plane that are programmed using the update messages of FIG. 1.

FIG. 2 is a first embodiment of a network device 200 (e.g., router or switch) that is used for forwarding packets to neighbor network devices. The network device 200 includes a control plane 210 and a data plane 220. The control plane 210 is generally a management layer for configuring, updating, and controlling the data plane 220. The control plane includes a controller 230, which can be a Central Processing Unit (CPU), processor, application-specific integrated circuit (ASIC), microcontroller, or any hardware logic that can receive packets and provide switch management and control in response thereto. The controller 230 has access to a memory 240 that can be a Dynamic Random Access Memory (DRAM), Flash memory, or other type of RAM or ROM. The memory 240 is used to store an operating system 250 for the switch 200. The memory 240 may also include a boot loader program 260, which is a first program executed after a reboot of the controller 230, and which can run basic hardware tests before booting up the operating system 250 (booting up or to boot up means to initialize software associated with a module or component and bring it to an operational state). Although a single memory is shown, the memory 240 can be divided into multiple memories and even memories of different types. A communications bus 276 allows communications between the controller 230 and the data plane 220. The communications bus 276 can be any desired bus type, such as PCI, PCIe, AGP, etc. The data plane 220 includes input port 280 and output port 282 used for receiving and sending network packets, respectively. Switching logic 290 is positioned intermediate the input and output ports. The switching logic 290 includes hardware for switching in accordance with layer 2, layer 3 or both. The switching logic 290 can include a forwarding information base (FIB 292), which can be programmed by the controller 230 to ensure packets are switched to the proper output port 282.

The control plane 210 further includes a routing information base (RIB) 294, which stores prefix information for network devices on the network. As shown at 295, when an update message is received, such as update message 120 from FIG. 1, the controller 230 can receive the location and ID prefixes and unpack the ID prefixes from the update message. The controller 230 can execute an import-and-policy application 296 that can apply the router policy to the prefixes before storing them in the RIB 294. The controller 230 can then execute regular updates to program the FIB 292 using data within the RIB 294. The controller 230 can also transmit the re-announce update message, such as is shown at 130 in FIG. 1. The re-announce message can include location prefix with the device identifiers as an attribute of the location prefix. In this way, limited messages need to be re-announced allowing convergence to be achieved more rapidly.

Figure 3:
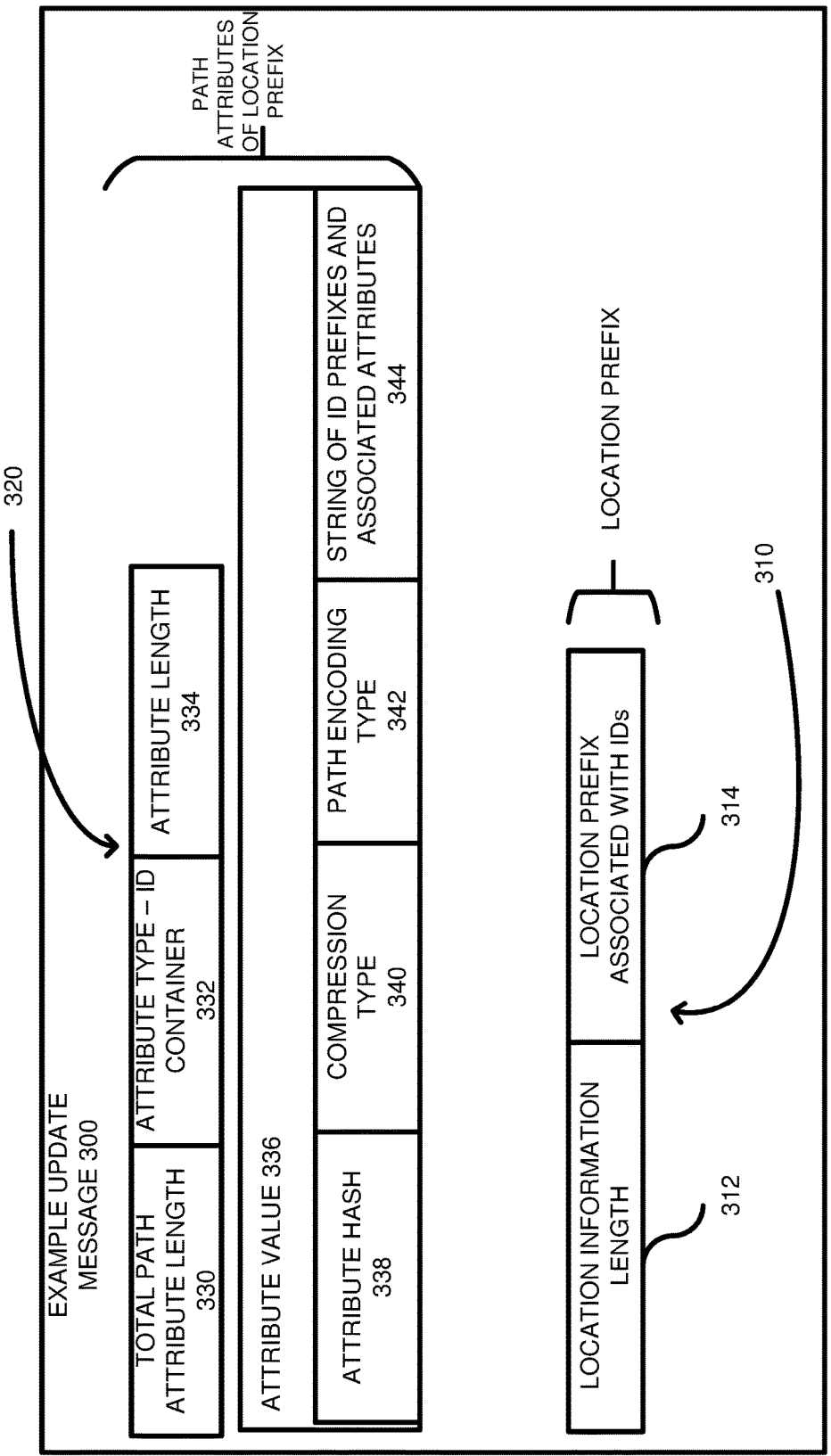
FIG. 3 is an example format of an update message according to one embodiment.

FIG. 3 is an example format of an update message 300 that can be used. The update message 300 can include a location prefix section 310 having one or more of location prefixes describing how a network zone can be reached. The location prefix section 310 can include a length parameter 312 and the one or more location prefixes 314. The prefixes 314 can be used to identify a network zone, such as by identifying the edge router (e.g., 112) within the network zone. A second section 320 includes path attributes of the location prefix 314. The path attributes can include a total path attribute length 330, an attribute type 332, an attribute length 334, and an attribute value 336. The attribute value 336 includes an attribute hash 338, a compression type 340, a path encoding type 342, and a string of ID prefixes and associated ID prefix attributes 344.

An example encoding structure is as follows:
Attribute Type (e.g., 1 byte)—a custom number;
Attribute Length (e.g., 2 bytes)—calculated after serializing the attribute and can vary.
Attribute Value—a Value portion of the type-length-value, and can have additional internal structure as follows:
Attribute Hash—16 bytes—used to determine if the attribute has changed.
Compression Type—1 byte (256 different compression options possible)
Path Encoding Type—1 byte—describes how prefixes and attributes are combined.
The binary section—includes the rest of the attribute, with the compression contents of the container including a string of ID prefixes and associated attributes.

Another option is to have the Type-Length-Value (TLV), and value section starts with the Hash value of some length. The hash type (and its length) consequently, compression type, and path encoding Type are configured as part of the BGP process configuration, so the router knows how to decode the attribute.

In one example where BGP is used, the location prefix 310 is stored in the Network Layer Reachability Information (NLRI) section of the BGP update message and attributes of the location prefix 320 are stored in the path attributes section of the BGP update message. Other formats and parameters can be used. Additionally, different protocols can have a different update message structure.

Figure 4:
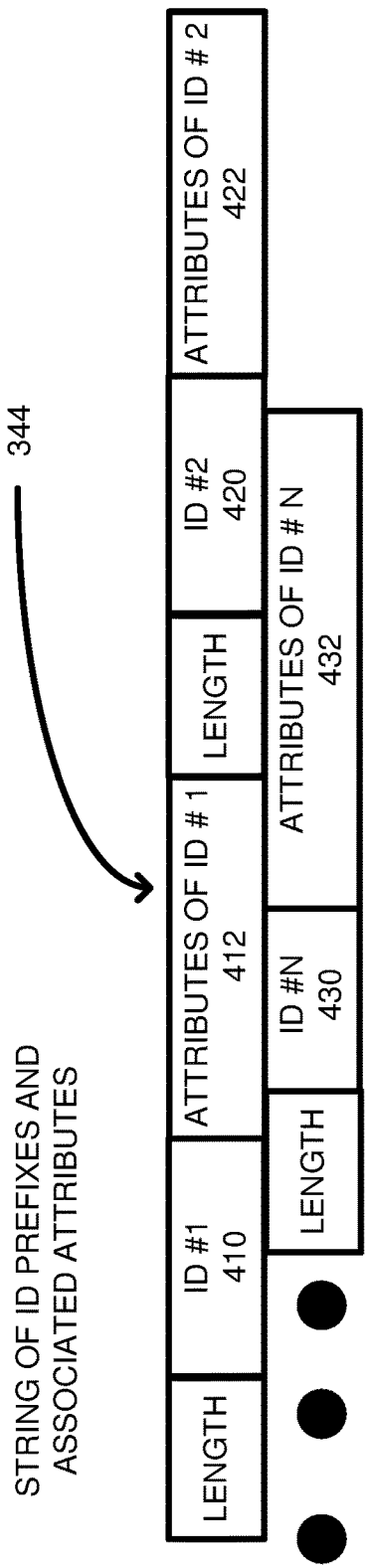
FIG. 4 is an example format showing a client ID container stored as an attribute within the update message of FIG. 3.

FIG. 4 shows further details of the string of ID prefixes 344 of FIG. 3. The string of ID prefixes 344 can be considered an ID prefix container. As indicated above, the ID prefixes and associated attributes can be compressed in some embodiments so that a number of ID prefixes is maximized. However, compression is an optional feature and need not be used. The string of ID prefixes 344 has length fields before each ID field and attribute field so as to be easily parsable. ID prefix 1, shown at 410, is a first client ID prefix within a network zone. For example, turning to FIG. 1, the client ID prefix can be for a network device 114 within a network zone 110C, wherein the location prefix 314 (FIG. 3) is associated with the network zone. The attributes of ID prefix 1, shown at 412, can be any desired attribute. Client ID prefix 2, shown at 420, can be associated with another network device 114 within the same network zone as prefix 410. Thus, the string of ID prefixes 344 can have in common that they are all associated with the same network zone. However, the attributes of the client ID prefixes can vary. For example, attributes 412 can be an attribute type AS_Path, while attributes 422 of client ID prefix 2 can be a Next_Hop type attribute. As shown at 430, a client ID prefix N (where N is any desired integer) can have attributes 432. Thus, any number of client ID prefixes can be concatenated with their associated attributes and the attributes of each can differ. It should be noted that standard BGP does not allow attributes of different types to be associated with prefixes. However, using an attribute type that is ID container indicates to a receiving network device that a string of ID prefixes and their associated attributes are included as an attribute of the location prefix. In this sense, the attributes 412, 422, 432 are attributes embedded within the location attribute. And, the attributes 412, 422, 432 can all be different.

Figure 5:
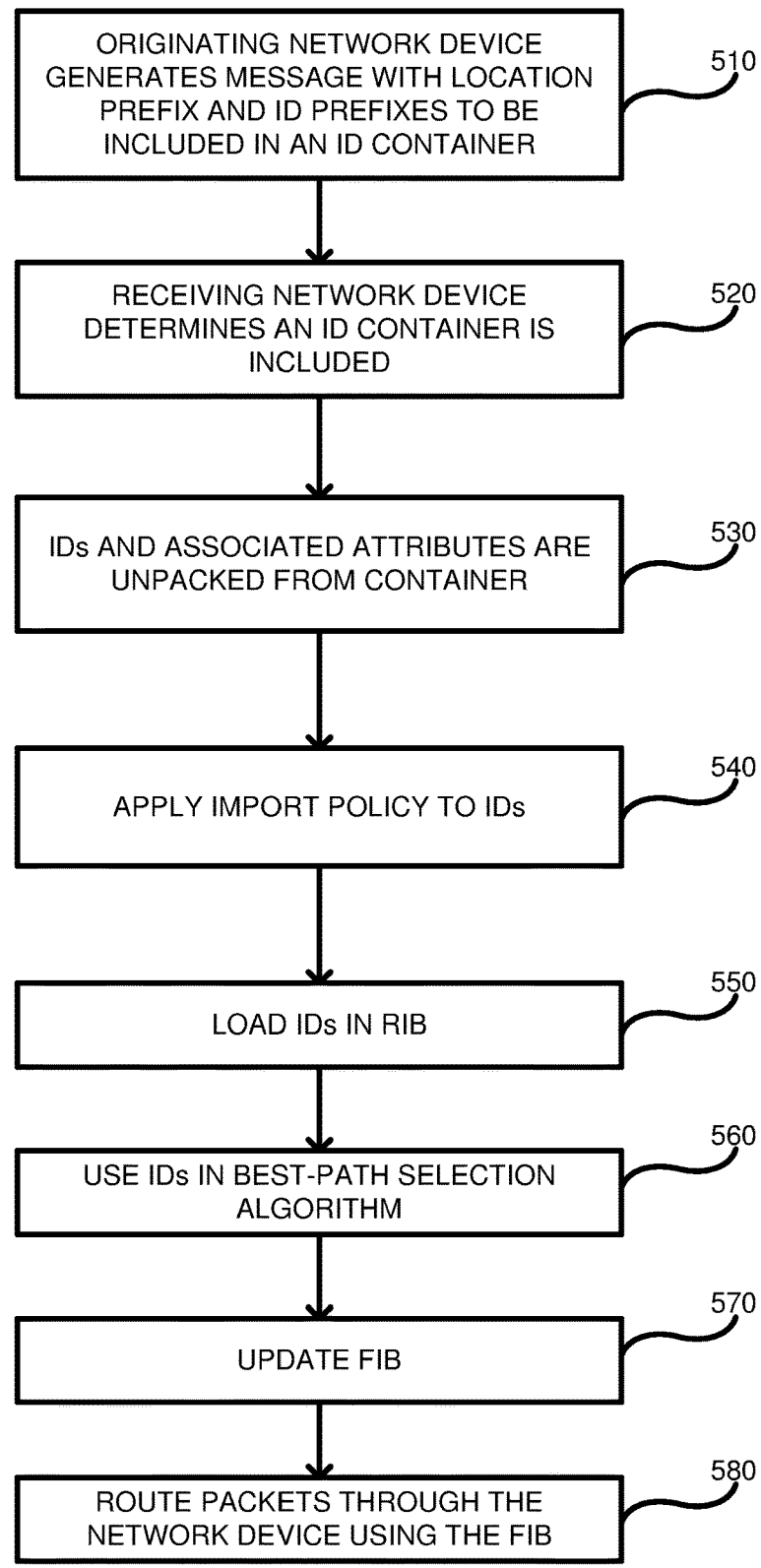
FIG. 5 is a flowchart of an embodiment for generating an update message and routing packets through a network device programmed in accordance with the update message.

FIG. 5 is a flowchart according to one embodiment for updating prefixes within a network. In process block 510, an originating network device can generate messages with a location prefix and a plurality of ID prefixes associated with the location prefix and stored as an attribute of the location prefix. The location prefix can be a /32 prefix unique for an AS or network fabric and AS/attached client pair. This prefix is associated with the Autonomous System Number of the physical fabric/device that is originating it, and does not change. Consequently, it specifies a location in the network topology, rather than a service. An ID prefix is a prefix announced by a client attached to a specific AS or network fabric of the location prefix. These are prefixes announced by client services attached to the AS or network fabric. Because of this, a same prefix (ID) might be announced from several different locations in the network. In that case, the same ID prefix could be included in the ID container attribute of two or more different location prefixes.

A feature of the current embodiment is to distribute ID prefixes, as the attribute of the location prefix. As with standard update messages, location prefixes are set as a next-hop of the ID prefixes. This way, ID prefixes are not sent explicitly in the NLRI section of the update messages, and do not compete for the CPU resources (best path-calculations, update packing, update message sending through socket calls, MRAI cycles, etc.) during the convergence time. This can be achieved by distributing the ID prefixes with a dedicated multi-hop BGP sessions or other protocols, but it requires additional infrastructure. With ID container support, no additional BGP sessions, or dedicated BGP controllers/servers are required, which removes the scalability constraints and availability challenges. The ID prefixes, together with relevant attributes, are packed into a dedicated optional-transitive attribute of the location NLRI. Due to this relationship, every BGP speaker in the network can establish a loop-free path toward the location prefix, and also have the latest ID mapping present. Following the initial convergence for the location prefix, any mapping updates are propagated along the established loop free-path, as location prefix implicit-withdraw. Because ID prefixes are distributed as an optional-transitive attribute of an NLRI, they are not directly subject to the BGP convergence process. From the BGP domain perspective, transit BGP speakers converge only for location prefixes. These are the only prefixes for which speakers should select a best-path before packaging it into an update message and propagating. For every location path present in the RIB, relevant ID attributes are unpacked, ID prefixes run through an optional import-policy, and also installed in the RIB using the recursive next-hops. Standard best-path selection process can be run.

By default, the ID prefixes are not announced to other BGP speakers by non-originators. If any of the ID prefixes or ID prefix attributes change, the originator repacks the whole ID container and sends an implicit-withdraw for the location. Loc/ID mapping is performed based on configured policy on a selected BGP originating speakers.

There are several options of how Loc/ID mapping can be performed at the ID Container originator: Option 1—static policy mapping. With this option, a router is explicitly configured with both /32 location prefix to announce, as well as with all ID prefixes that need to be included in the ID Container attribute of this location prefix. Every prefix that is announced as ID is set explicitly using prefix list/route maps or any other policy definition mechanism on the router. The same applies to the attributes associated with IDs, as they also are configured explicitly through policy. Option 2—dynamic policy mapping. With this option, a router is configured with the /32 location prefix to announce, and a mapping policy for the ID prefixes. ID prefixes can be mapped to the location based on the specific community attribute. This way, clients attached to the network are able to add and withdrawn specific IDs dynamically, just by tagging them with community. Other additional attributes might also be used for mapping, as well as additional prefix-list to limit the mapping to specific prefix ranges. Original path attributes of the IDs can also be modified by the mapping policy. Option 3—dynamic mapping. This option is the same as Option 1, with the difference that the mapping is being programmed explicitly by the controller, through the router. This option is useful when an ID container is used as a fallback option for a controller based Loc/ID implementation.

To account for a specific failure modes, a conditional advertisement option can be available. A Loc/ID originator router will not announce a location prefix, or will withdraw the location prefix, if it does not have all of the ID prefixes or a particular ID prefixes present in the RIB. Which IDs are required is specified by the conditional mapping feature policy. This guards against the black-holing scenarios possible when BGP speakers select a location path originated by the router that due to a failure, does not have the ID prefixes. Another solution to this problem is having several different location prefixes per client. The location prefixes are still unique for a specific client and a topology location.

ID prefixes can be packed by the originators into a custom, optional-transitive, extended length attribute. The option to use compression for the attribute value allows for a possibility to convey a significant number of ID prefixes inside a single location update message. A simple implementation can pack IDs together with attributes into standard update messages, concatenate them into a byte-string and compress. An advantage of such an approach is minimizing code rewrite. Standard update packing can be used, and upon attribute recognition and value decompression, the byte-string can be fed into a standard update processing pipeline.

In process block 520, a network device can receive an update message generated in process block 510. The controller in the network device can parse the update message and determine that the attribute type is an ID container. For example, in FIG. 3, it can be determined that field 332 is a special attribute type indicating that the attribute 320 includes an ID container. In process block 530, if the update message includes an ID container, the IDs and associated attributes are unpacked from the container. For every prefix that is present in the Loc-RIB of a BGP speaker, if the prefix has an ID container as an attribute, the contents of the ID container are extracted, run through an option import/inbound policy, and installed in the Loc-RIB. For example, in process block 540, an import policy is applied to the ID prefixes. Additionally, in process block 550, the ID prefixes are loaded into the RIB, such as RIB 294 in FIG. 2. This also applies to prefixes of which paths are not selected as best. After being in the Loc-RIB, ID prefixes are considered during standard best-path selection runs, with the recursive next-hop resolution. If the prefix is being withdrawn from the Loc-RIB, all associated ID prefixes are also withdrawn. When a router receives an implicit-withdraw for a location prefix, it will check if the hash value of the ID container has changed. If the value has changed that means that ID container contents has changed. In such a case, the router extracts the container contents and re-installs all the ID prefixes into Loc-Rib again. ID prefixes do not need to be advertised to peers as a standard NLRI, unless configured specifically through policy.

In process block 560, the ID prefixes within the RIB can be used in a best-path selection algorithm, which can be periodically executed by a controller in the control plane of the network device. When the best paths are calculated, the controller can then update the FIB (process block 570). Finally, in process block 580, packets are routed through the network device using the FIB.

Figure 6:
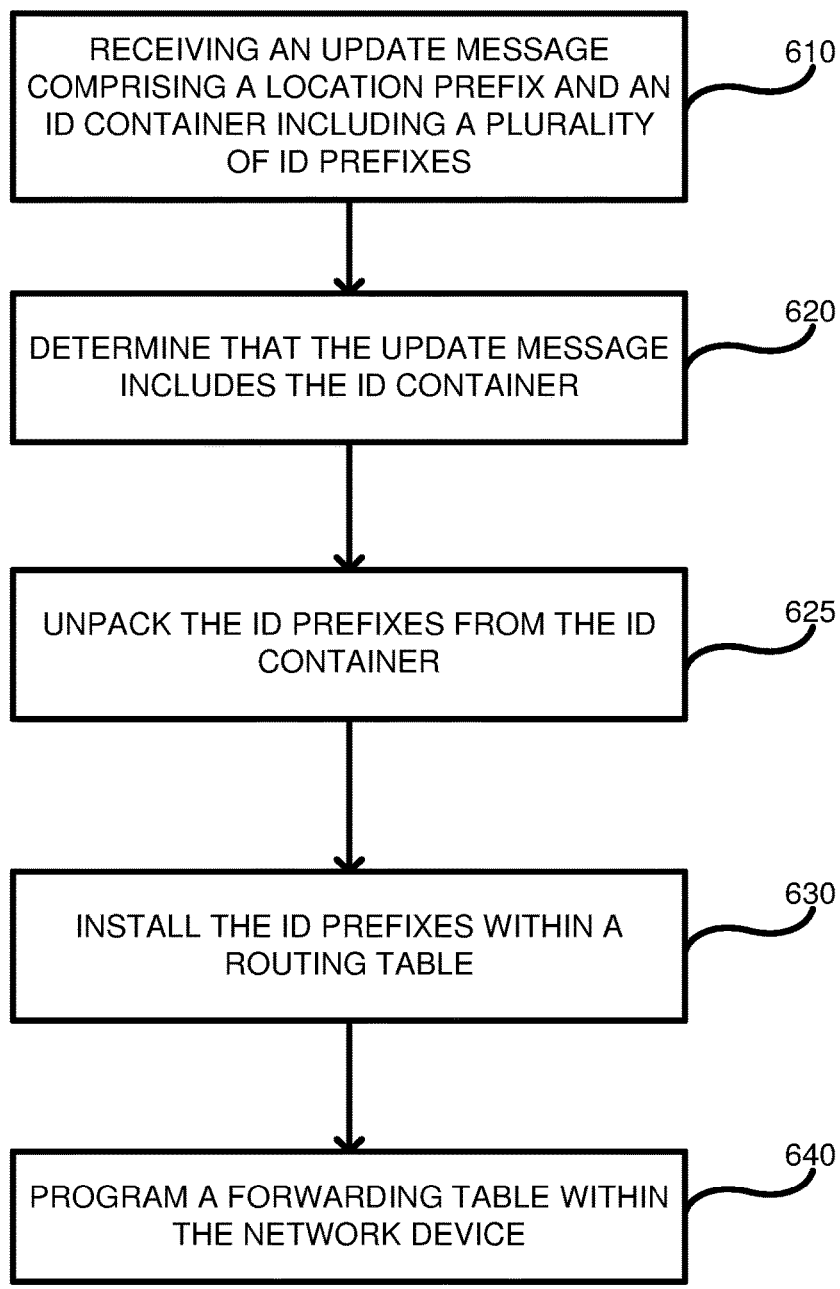
FIG. 6 is a flowchart according to another embodiment for programming a network device in accordance with the update message.

FIG. 6 is a flowchart of a method for distributing network device prefixes within a network according to one embodiment. In process block 610, an update message is received comprising a location prefix and an ID container including a plurality of ID prefixes. The ID container can be stored in the message as an attribute of the location prefix and instead of being a standard attribute, the ID container can include ID prefixes associated with the location prefix. The location prefix can be associated with a zone and the ID prefixes can be prefixes associated with network devices within the zone. For example, the location prefix can be associated with an edge router of a zone, such as edge router 112C, while the ID prefixes are associated with network devices within the network zone. As an example of a network device within a network zone is a router or switch within an AS. Typically, all network devices within a zone are controlled by the same administrator who can control policy applied on the network devices. In process block 620, a determination can be made that the update message includes an ID container. For example, a controller (see controller 230, FIG. 2) can parse the attributes of the update message and determine that the attribute type (see 332, FIG. 3) matches that of an ID container. Such a determination is made by a simple comparison operation between the different types. In process block 625, the ID prefixes can be unpacked. Unpacking of the prefixes can include decompressing the prefixes by first analyzing the compression type (see 340, FIG. 3) and performing decompression based on the type of compression used, if any. The unpacking can also include checking a hash value (e.g., 338, FIG. 3) to see if the ID prefixes have changed. In process block 630, the ID prefixes can be installed within the RIB (e.g., RIB 294, FIG. 2). Policy can be applied to the prefixes. Additionally, each prefix attribute can be extracted from the ID container and installed within the RIB. Installation generally includes storing the network device prefixes in memory (i.e., the RIB) within a control plane of the network device. In process block 640, a forwarding table can be programmed within the network device using the RIB. For example, a FIB within a data plane of the network device can be programmed so that packets passing through the network device can be automatically routed to the proper output port.

Figure 7:
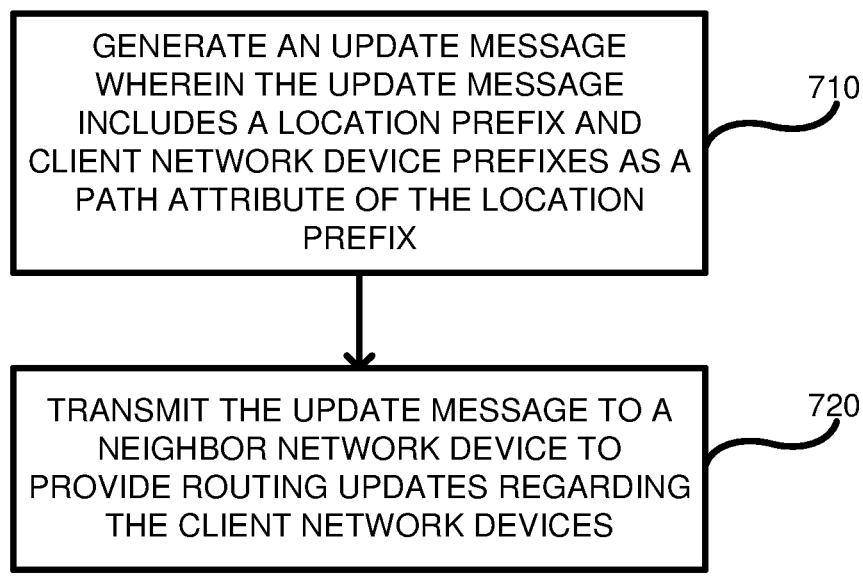
FIG. 7 is a flowchart according to another embodiment for generating an update message.

FIG. 7 is a flowchart of a method according to one embodiment for distributing network prefixes to a network. In process block 710, an update message is generated wherein the update message includes a location prefix and at least one client network device prefix. Typically, there are multiple client network device prefixes, also called ID prefixes, within the update message. The client network device prefixes are associated with network devices, such as routers, within a network zone, such as an AS. The location prefix can be a single prefix associated with multiple client network device prefixes and the client network device prefixes can be an attribute of the location prefix in the update message. In some embodiments, the update message can include a compression type as a path attribute. Additionally, each client network device prefix can be associated with an attribute, such that the client network device prefix attributes are stored within the update message as a location prefix attribute. In this way, the client network device prefix attributes are attributes embedded in a location attribute. Additionally, the update message can include a hash value associated with the client network device prefixes so that the controller can determine if the client device prefixes have changed. If the hash value has not changed, then the controller need not process the update message. Thus, by examining the hash value, the controller can quickly determine whether or not to further process the update message. In the case of BGP, the update message can have an NLRI section including the location prefix and the client network device prefixes can be within the path attribute section of the update message. In process block 720, the network device that generated the update message can transmit the update message to a neighbor network device to provide routing updates regarding the client network devices. The neighbor network device that receives the update message can unpack the message and load the client network device prefixes within the RIB and FIB. Additionally, the neighbor network device can re-transmit the update message including the location prefix with the client network prefixes within the ID container.

Figure 8:
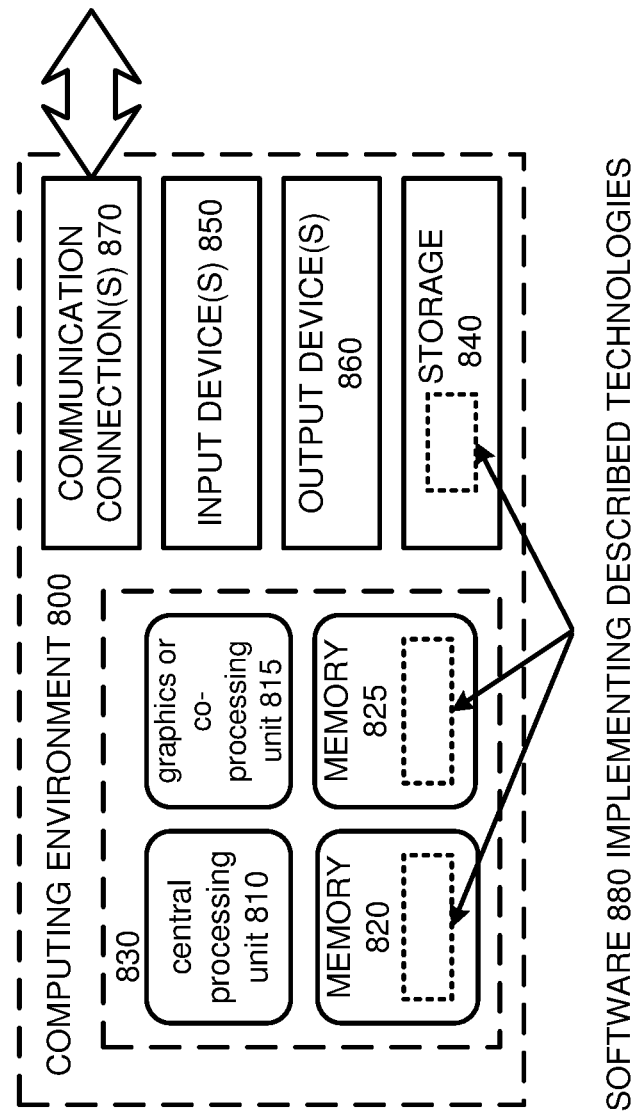
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., router, switch, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of distributing prefixes, the method comprising:
    receiving, in a network device, a Border Gateway Protocol (BGP) update message comprising a location prefix and an identification (ID) container, which is a BGP path attribute having a plurality of ID prefixes associated with the location prefix, wherein the location prefix identifies an Autonomous System (AS) and the plurality of ID prefixes are a list of client network devices positioned within the AS;
    determining, by the network device, that the update message includes the ID container as the BGP path attribute;
    unpacking, by the network device, the ID prefixes together with attributes of the ID prefixes from the ID container, wherein the unpacking includes extracting the ID prefixes from the ID container;
    installing the ID prefixes within a routing table within the network device;
    updating a forwarding table within the network device using the routing table; and
    switching packets through the network device using the forwarding table.

2. The method of claim 1, wherein the unpacking of the update message includes decompressing the ID prefixes from the ID container.

3. The method of claim 1, wherein the ID container includes a compression type describing a type of compression used on the ID prefixes within the ID container.

4. The method of claim 1, wherein the unpacking of the update message includes identifying a hash value and using the hash value to determine whether contents of the ID container changed.

5. The method of claim 1, wherein the update message is re-announced by the network device for the location prefix, wherein the re-announced update message includes the ID container and the re-announcing includes transmitting the update message to another network device.

6. A computer-readable storage medium, which is non-transitory, including instructions that upon execution cause a network device to:
    generate an update message within a control plane of a network device located in a network zone, the network zone including a plurality of client network devices or services, wherein the update message includes a location prefix associated with the network zone and with client network device prefixes, of the client network devices, as a path attribute of the location prefix, wherein the client network devices or services are within the network zone and the client network devices have the location prefix in common;
    transmit the update message to a neighbor network device to provide routing updates regarding the client network devices or services;
    program the neighbor network device using the update message; and
    switch packets through the programmed neighbor network device.

7. The computer-readable storage medium of claim 6, wherein the path attribute includes a compression type describing how the client network device prefixes and associated attributes are compressed.

8. The computer-readable storage medium of claim 6, wherein the path attribute includes attributes of the client network device prefixes, wherein different client network device prefixes have different attributes within an ID container attribute.

9. The computer-readable storage medium of claim 6, wherein the path attribute includes a hash value associated with the client network device prefixes so as to determine if the client network device prefixes or their path attributes changed.

10. The computer-readable storage medium of claim 6, wherein the update message is a Border Gateway Protocol (BGP) update message with the location prefix being within a Network Layer Reachability Information (NLRI) section of the update message and the client network device prefixes being within a dedicated path attribute of the location prefix.

11. The computer-readable storage medium of claim 6, wherein the update message includes the client network device prefixes within an ID container path attribute.

12. The computer-readable storage medium of claim 6, further including instructions that upon execution cause a receiving network device to:
- receive the update message and determine that the update message includes a container including the client network device prefixes;
- unpack the client network device prefixes and path attributes associated with the client network device prefixes by extracting the client network device prefixes from the container; and
- store the client network device prefixes within a routing information base on the receiving network device.

13. The computer-readable storage medium of claim 6, further including instructions that upon execution cause a receiving network device to:
- re-transmit the update message including the location prefix with the client network device prefixes within the path attribute.

14. The computer-readable storage medium of claim 6, wherein the network zone is an Autonomous System (AS) and wherein the plurality of client network devices are within the AS.

15. A network device, comprising:
- a first memory for storing a routing information base (RIB);
- a second memory for storing a forwarding information base (FIB); and
- a controller coupled to the first and second memories, the controller being configured to:
  - receive an update message;
  - identify that the update message includes a path attribute type indicating that a plurality of client network device prefixes are stored within an attribute associated with a location prefix, such that the plurality of client network devices prefixes are associated with a same location prefix;
  - load the client network device prefixes within the first memory as the RIB;
  - program the network device using the RIB to program the FIB;
  - switch packets through the network device using the FIB.

16. The network device of claim 15, wherein the network device is a router within a data center.

17. The network device of claim 15, wherein the controller is configured to re-transmit the update message including the client network device prefixes stored as the attribute associated with the location prefix.

18. The network device of claim 15, wherein the update message includes attributes of the client network device prefixes, wherein the attributes differ between at least some of the client network device prefixes.

* * * * *